(12) United States Patent
Komitsu et al.

(10) Patent No.: US 6,642,309 B2
(45) Date of Patent: Nov. 4, 2003

(54) CURABLE RESIN COMPOSITION

(75) Inventors: Shintaro Komitsu, Takasago (JP); Toshihiko Okamoto, Kobe (JP); Hiroshi Iwakiri, Kobe (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 10/218,072

(22) Filed: Aug. 14, 2002

(65) Prior Publication Data

US 2003/0105261 A1 Jun. 5, 2003

(30) Foreign Application Priority Data

Aug. 14, 2001 (JP) ........................................ 2001-245881
Jul. 5, 2002 (JP) ........................................ 2002-198036

(51) Int. Cl.$^7$ ............................................. C08G 77/18
(52) U.S. Cl. ........................... 525/100; 528/18; 528/21; 528/23
(58) Field of Search ........................... 525/100; 528/18, 528/23, 21

(56) References Cited

U.S. PATENT DOCUMENTS

| | | | | |
|---|---|---|---|---|
| 4,593,068 A | * | 6/1986 | Hirose et al. | 525/100 |
| 4,910,255 A | * | 3/1990 | Wakabayashi et al. | 525/100 |
| 4,977,228 A | * | 12/1990 | Wakabayashi et al. | 528/12 |
| 5,030,691 A | * | 7/1991 | Kohmitsu et al. | 525/100 |
| 6,350,345 B1 | * | 2/2002 | Kotani et al. | 156/329 |

FOREIGN PATENT DOCUMENTS

| | | |
|---|---|---|
| EP | 0 918 062 A1 | 5/1999 |
| JP | 1-236258 A | 9/1989 |
| JP | 10-251552 A | 9/1998 |

* cited by examiner

*Primary Examiner*—Margaret G. Moore
(74) *Attorney, Agent, or Firm*—Sughrue Mion, PLLC

(57) ABSTRACT

The object of the present invention is to provide a novel acrylic-modified silyl-terminated polyether resin composition which is advantageous not only in terms of the availability of raw materials and the ease of synthetic reaction, but also in fast-curing, good storage stability, good weatherability, high adhesiveness, thus promising high potentials of industrial utilization. Further, the object of the present invention is also to develop an environment-friendly curable composition which is a major social consideration. The composition is a curable composition comprising an oxyalkylene polymer (A) containing silyl functional group capable of crosslinking by forming a siloxane bond and a copolymer (B) having a molecular chain comprising alkyl acrylate and/or alkyl methacrylate monomer units and containing silyl functional group capable of crosslinking by forming a siloxane bond, said copolymer (B) having both dialkoxysilyl and trialkoxysilyl groups as said silyl functional group.

21 Claims, No Drawings

CURABLE RESIN COMPOSITION

FIELD OF THE INVENTION

The present invention relates to a curable resin composition. The object of the invention is to provide a novel acrylic-modified silyl-terminated polyether resin outstanding in fast-curability, storage stability, weatherability, and adhesiveness.

BACKGROUND OF THE INVENTION

Room temperature-curable resin compositions based on a oxyalkylene polymer having at least one reactive silyl group (a silicon-containing group having an silicon atom attached to a hydroxyl or hydrolyzable group and being capable of forming a siloxane bond), particularly methyldimethoxysilyl, can be used as architectural sealants, adhesives, and other artifacts and promise good performances at low cost. Furthermore, the so-called acrylic-modified silyl-terminated polyether resin composition representing a formulation of a reactive silyl group-containing acrylic copolymer with said oxyalkylene polymer is also available commercially and in broad use as the base polymer for high weather-resistant sealants or the base polymer for room temperature-curable adhesives used as one package system.

The acrylic-modified silyl-terminated polyether resin composition referred to above has characteristics distinct from said methyldimethoxysilyl group-containing oxyalkylene polymer, i.e. greater initial tack, firmer adhesiveness to various adherends, and better weatherability, and is in broad use as an adhesive or sealant having an excellent bonding function and a good storage stability. However, it is reported that this composition has some technical drawbacks to be overcome in the aspects of internal curability and cure rate (Japanese Kokai Publication Hei-10-251552).

Referring to the reactive silyl functional group of said acrylic copolymer, the use of a copolymer containing trimethoxysilyl group is proposed in Japanese Kokai Publication Hei-01-236258, for instance. However, in the case of this copolymer, it is not only difficult to control the pot life because of the dramatic increase in cure rate but the adhesiveness to certain adherends such as polycarbonate tend to be poor.

Furthermore, the use of trimethoxysilyl as the reactive silyl functional group of oxypropylene polymers reportedly provides for good internal curability and a characteristically very high cure rate. However, in this case it is not only difficult to control the pot life and assure sufficient storage stability but the adhesive function attainable is inferior to the commercial methyldimethoxysilyl-containing oxypropylene polymers, thus being of no industrial value and, hence, having not been launched onto the market.

Japanese Kokai Publication Hei-10-251552 proposes, as an acrylic-modified silyl-terminated polyether composition having good storage stability, good internal curability, very fast cure rate and good adhesive function, an acrylic-modified silyl-terminated polyether resin composition whose resin component comprises (A) an oxypropylene polymer having a main chain substantially consisting of oxypropylene units and containing trimethoxysilyl as the reactive silyl functional group, (B) an oxypropylene polymer having a main chain substantially consisting of oxypropylene units and containing methyldimethoxysilyl group as the reactive silyl functional group, and (C) an acrylic copolymer containing a reactive silyl group which is obtainable by polymerizing, as a main component, at least one monomer selected from the group consisting of acrylic esters and methacrylic esters containing an alkoxysilyl group within the molecule and having an alkyl group containing 1 to 20 carbon atoms.

However, this technology has the drawback that two kinds of oxypropylene polymers having dissimilar reactive silyl functional groups and, further, an acrylic polymer having silyl functional group must be independently produced and handled. In particular, the trimethoxysilyl group-containing polyoxypropylene has not been commercially available as yet so that the technology appears to be unsatisfactory in terms of availability of raw material, aspect of synthetic reaction, storage stability and so on.

An acrylic-modified silyl-terminated polyether resin composition which is advantageous not only in terms of the availability of raw materials and the ease of synthetic reaction, but also in fast-curing, good storage stability, good weatherability, high adhesiveness, and further is benign on the environment, which is a major social consideration in recent years, if provided, should be of great industrial value.

OBJECT OF THE INVENTION

The object of the present invention is to provide a novel acrylic-modified silyl-terminated polyether resin composition which is advantageous not only in terms of the availability of raw materials and the ease of synthetic reaction, but also in fast-curing, good storage stability, good weatherability, high adhesiveness, thus promising high potentials of industrial utilization. Further, the object of the present invention is also to develop an environment-friendly curable composition which is a major social consideration.

SUMMARY OF THE INVENTION

As the result of their intensive research, the inventors of the present invention discovered that, in the art of curable compositions comprising an oxyalkylene polymer (A) having silyl functional group and a copolymer (B) having a silyl functional group and a molecular chain comprising alkyl acrylate and/or alkyl methacrylate monomer units, the use of a curable composition containing said copolymer (B) having both dialkoxysilyl and trialkoxysilyl groups as the silyl functional group results in a high cure rate without being compromised in the good adhesiveness, high weatherability and good storage stability of the conventional acrylic-modified silyl-terminated polyether resin composition.

It was also found that the acrylic-modified silyl-terminated polyether resin composition of the invention permits not only the use of the conventional organotin catalyst but also the use of those cure-accelerating catalysts other than organotin compounds with which a practically useful cure rate could not be obtained in the past.

The present invention, therefore, is related to a curable composition comprising an oxyalkylene polymer (A) containing silyl functional group capable of crosslinking by forming a siloxane bond and a copolymer (B) having a molecular chain comprising alkyl acrylate and/or alkyl methacrylate monomer units and containing silyl functional group capable of crosslinking by forming a siloxane bond, said copolymer (B) having both dialkoxysilyl and trialkoxysilyl groups as said silyl functional group.

Furthermore, the above-mentioned copolymer (B) has both dialkoxysilyl and trialkoxysilyl groups within the molecule and/or is a mixture of a copolymer having dialkoxysilyl functional group and a copolymer having trialkoxysilyl functional group.

The present invention is further related to an acrylic-modified silyl-terminated polyether curable composition which comprises said polymer (A) contains at least one dimethoxysilyl group per molecule and has a number average molecular weight of not less than 6,000, while said copolymer (B) contains at least an average of 0.2 trimethoxysilyl groups and at least an average of 0.2 dimethoxysilyl groups per molecule, and which comprises further contains a cure accelerating catalyst (C).

Furthermore, in accordance with the invention, a substantially useful cure rate can be obtained even with a non-organotin catalyst, for example an organic carboxylic acid, an organic carboxylic acid metal salt, an amine compound, an acid phosphate ester or a Group 3B or Group 4A metal as said (C) cure accelerating catalyst.

According to the present invention, an acrylic-modified silyl-terminated polyether curable composition not only showing an improved cure rate but also exhibiting good adhesiveness and storage stability can be obtained.

DETAILED DESCRIPTION OF THE INVENTION

As the oxyalkylene polymer constituting the main chain of the (A) component polymer according to the invention, the polymer which can be represented by the following general formula can be used.

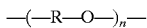

(wherein R represents a bivalent alkylene group of 1 to 4 carbon atoms).

The above repeating unit specifically includes —CH$_2$O—, —CH$_2$CH$_2$O—, —CH$_2$CH(CH$_3$)O—, —CH$_2$CH(C$_2$H$_5$)O—, —CH$_2$C(CH$_3$)$_2$O—, and —CH$_2$CH$_2$CH$_2$CH$_2$O—, among others. The main chain of said oxyalkylene polymer may consist exclusively of one kind of repeating unit or consist of two or more kinds of repeating units. Furthermore, the polymer may additionally contain other units, such as a urethane bond-forming unit, in the main chain within the range not materially altering the characteristics of the oxyalkylene polymer. The urethane bond-forming unit mentioned above includes, but is not limited to, the unit obtainable by the reaction of a polyol having the repeating unit of the above general formula with an aromatic polyisocyanate, such as toluene (tolylene) diisocyanate, diphenylmethane diisocyanate, or xylylene diisocyanate; or an aliphatic polyisocyanate, such as isophorone diisocyanate, or hexamethylene diisocyanate. From the standpoint of availability, oxypropylene polymer is preferred. This oxypropylene polymer may be whichever of a linear polymer or a branched polymer, or a mixture thereof. Furthermore, it may contain other monomer units but the monomer unit of the formula given above preferably accounts for not less than 50 weight %, more preferably accounts for not less than 80 weight %.

The reactive silyl group-containing oxyalkylene polymer for use as the (A) component of the invention is preferably prepared by introducing a reactive silyl group into an oxyalkylene polymer containing a functional group.

The molecular structure of the reactive silyl group-containing oxyalkylene polymer as the (A) component of the invention may vary according to the intended application and expected characteristics, and can be produced by the method described in Japanese Kokai Publication Sho-63-112642 or the method described in Japanese Kokai Publication Hei-11-000644, for instance.

The molecular weight, molecular weight distribution, and other characteristics of said oxyalkylene polymer depend on the polymerization technique and conditions used. In the case where the intended application requires low viscosity, for example adhesives or coatings, it is in many instances advantageous, from molecular design points of view, to use a polymer having a high molecular weight and a narrow molecular weight distribution, i.e. a small GPC (gel permeation chromatography) Mw/Mn value, but such characteristics are hardly obtainable by the usual method of polymerizing oxyalkylenes (an anionic polymerization process using caustic alkali) or the chain extension reaction method starting with such a polymer. Rather, such a polymer can be obtained only by special polymerization techniques using a cesium metal catalyst, a porphyrin-aluminum complex catalyst as typically described in Japanese Kokai Publication Sho-61-197631, Japanese Kokai Publication Sho-61-215622, Japanese Kokai Publication Sho-61-215623, and Japanese Kokai Publication Sho-61-218632, a double metal cyanide complex catalyst as typically disclosed in Japanese Kokoku Publication Sho-46-27250 and Japanese Kokoku Publication Sho-59-15336, or a polyphosphazene salt catalyst as typically disclosed in Japanese Kokai Publication Hei-10-273512, among others. For practical purposes, the technique employing a double metal cyanide complex catalyst is preferred. The molecular weight distribution of the reactive silyl group-containing oxyalkylene polymer is dependent on the molecular weight distribution of the precursor polymer prior to introduction of the reactive silyl group and, therefore, the molecular weight distribution of the precursor polymer is preferably as narrow as possible.

The introduction of reactive silyl groups can be achieved by a known technique. Thus, for example, the following techniques can be mentioned. For reference, these techniques are described in Japanese Kokai Publication Hei-03-72527 for the case of an oxyalkylene polymer obtained by using a double metal cyanide complex catalyst or the like, and in Japanese Kokai Publication Hei-11-60723 for the case of an oxyalkylene polymer obtained by using a polyphosphazene salt and active hydrogen as the catalyst.

(1) An unsaturated group-containing oxyalkylene polymer is produced by reacting an oxyalkylene polymer having a hydroxyl or the like functional group at the molecular terminus with an organic compound having an active group reactive with said functional group and an unsaturated group, or by the copolymerization of an oxyalkylene with an unsaturated group-containing epoxy compound. The reaction product is then reacted with a reactive silyl group-containing hydrosilane for hydrosilylation.

(2) The unsaturated group-containing oxyalkylene polymer obtained in the same manner as described in the above paragraph (1) is reacted with a compound having a mercapto group and a reactive silyl group.

(3) An oxyalkylene polymer having a hydroxyl, epoxy, isocyanato, or the like functional group (hereinafter referred to as Y functional group) at a molecular terminus is reacted with a compound having both a functional group (hereinafter referred to as Y' functional group) which is reactive with said Y functional group and a reactive silyl group.

As the silicon compound having such a Y' functional group, there can be mentioned amino group-containing silanes such as γ-(2-aminoethyl)aminopropyltrimethoxysilane, γ-(2-aminoethyl)aminopropylmethyldimethoxysilane and γ-aminopropyltriethoxysilane; mercapto group-containing silanes such as γ-mercaptopropyltrimethoxysilane and γ-mercaptopropylmethyldimethoxysilane;

epoxysilanes such as γ-glycidoxypropyltrimethoxysilane and β-(3,4-epoxycyclohexyl)ethyltrimethoxysilane; vinyl type unsaturation-containing silanes such as vinyltriethoxysilane, γ-methacryloyloxypropyltrimethoxysilane, and γ-acryloyloxypropylmethyldimethoxysilane; chlorine atom-containing silanes such as γ-chloropropyltrimethoxysilane; isocyanato group-containing silanes such as γ-isocyanatopropyltriethoxysilane, γ-isocyanatopropylmethyldimethoxysilane, and γ-isocyanatopropyltrimethoxysilane; and hydrosilanes such as methyldimethoxysilane, trimethoxysilane, methyldiethoxysilane, and triethoxysilane; among others.

For the production of such compounds, there can be employed the processes disclosed in, inter alia, Japanese Kokai Publication Hei-03-47825, Japanese Kokai Publication Hei-03-157424, Japanese Kokai Publication Hei-11-100427, Japanese Kokai Publication 2000-143757, Japanese Kokai Publication 2000-169544, Japanese Kokai Publication 2000-169545, U.S. Pat. No. 6,197,912, WO00/37533, WO99/55755, WO01/12693, DE 19923300, CA 2303698, U.S. Pat. No. 6,121,354, DE 19849817, U.S. Pat. No. 6,001,946, etc.

The reactive silyl group to be introduced into the oxyalkylene polymer for use as the (A) component of the invention can be freely selected from among the reactive silyl groups which can be introduced by the above techniques according to the desired characteristics but from the standpoint of availability of raw materials, the reactive silyl group is preferably selected from the group consisting of methyldimethoxysilyl, trimethoxysilyl, methyldiethoxysilyl, triethoxysilyl, methyldiisopropenyloxysilyl and triisopropenyloxysilyl group. Among these, from the standpoint of the balance between cure rate and storage stability, methyldimethoxysilyl, trimethoxysilyl and triethoxysilyl group are preferred and methyldimethoxysilyl group is particularly preferred. To reconcile the two characteristic parameters of cure rate and storage stability, or for the other objects, it is possible to use two or more kinds of reactive silyl groups. For example, the combination of methyldimethoxysilyl and trimethoxysilyl, that of trimethoxysilyl and triethoxysilyl, and that of methyldimethoxysilyl and triethoxysilyl are useful. When such a combination is selected, the process for introducing dissimilar reactive silyl groups into one and the same molecule or the process using dissimilar silyl groups in combination, or both, can be exploited.

The number of reactive silyl groups to be introduced into the oxyalkylene polymer constituting the (A) component of the composition according to the invention is preferably an average of 0.3 through less than 10 per molecule, more preferably an average of 0.5 through less than 5 per molecule. If it is less than 0.3 on the average, no sufficient cure may be obtained. On the other hand, if it exceeds 10 on the average, the cured artifact will be drastically embrittled.

From the standpoint of post-cure elongation and peel strength, the number average molecular weight of the oxyalkylene polymer constituting the (A) component of the invention is preferably not less than 6,000, more preferably not less than 10,000. If the molecular weight is less than 6,000, the cured artifact will tends to be brittle and fragile.

The molecular weight distribution Mw/Mn (the ratio of weight average molecular weight to number average molecular weight) is preferably not more than 1.6 for achieving the balance between viscosity and physical properties. If the Mw/Mn ratio exceeds 1.6, this balancing effect is diminished and the viscosity tends to be increased. The effect is more evident when the Mw/Mn ratio is small. The preferred ratio is not more than 1.5.

The copolymer (hereinafter referred to as acrylic copolymer (B)) containing silyl functional group capable of crosslinking by forming a siloxane bond and comprising a molecular chain consisting of alkyl acrylate and/or acryl methacrylate monomer units is now described.

The acrylic copolymer (B) is an acrylic polymer consisting of alkyl acrylate monomer units and/or alkyl methacrylate monomer units, the alkyl moieties of which contain 1 to 20 carbon atoms, and containing reactive silyl-containing groups capable of crosslinking by forming siloxane bonds.

The alkyl acrylate monomer unit for the acrylic copolymer (B) according to the present invention can be selected from a broad range of known esters of acrylic acid, such as methyl acrylate, ethyl acrylate, n-propyl acrylate, n-butyl acrylate, isobutyl acrylate, tert-butyl acrylate, n-hexyl acrylate, 2-ethylhexyl acrylate, decyl acrylate, undecyl acrylate, lauryl acrylate, tridecyl acrylate, myristyl acrylate, cetyl acrylate, stearyl acrylate, behenyl acrylate, and biphenyl acrylate, among others. The methacrylate monomer units can also be selected from a broad range of known esters of methacrylic acid, such as methyl methacrylate, ethyl methacrylate, n-propyl methacrylate, n-butyl methacrylate, isobutyl methacrylate, tert-butyl methacrylate, n-hexyl methacrylate, 2-ethylhexyl methacrylate, decyl methacrylate, undecyl methacrylate, lauryl methacrylate, tridecyl methacrylate, myristyl methacrylate, cetyl methacrylate, stearyl methacrylate, behenyl methacrylate, and biphenyl methacrylate, among others.

The molecular chain of the acrylic copolymer (B) substantially consists of one or more kinds of alkyl acrylate and/or alkyl methacrylate monomer units. The term "substantially consist of said monomer units" as used here means that the proportion of said alkyl acrylate and/or alkyl methacrylate monomer units in the copolymer (B) is larger than 50%, preferably not less than 70%.

Referring to the combination of said monomer units, the preferred from compatibility and stability points of view is a copolymer comprising (a) an alkyl acrylate and/or alkyl methacrylate monomer unit containing 1 to 8 carbon atoms in its alkyl moiety and (b) an alkyl acrylate and/or alkyl methacrylate monomer unit containing not less than 9 carbon atoms in its alkyl moiety. The alkyl acrylate and/or alkyl methacrylate monomer containing 1 to 8 carbon atoms in its alkyl moiety as referred to above for the monomer unit (a) of the copolymer can be represented by the general formula (1):

$$CH_2=C(R^5)COOR^6 \quad (1)$$

(wherein $R^5$ represents a hydrogen atom or a methyl group; $R^6$ represents an alkyl group containing 1 to 8 carbon atoms)

Referring to the alkyl group $R^6$ in the above general formula (1), there can be mentioned methyl, ethyl, propyl, n-butyl, t-butyl and 2-ethylhexyl group, among others, although an alkyl group of 1 to 4 carbon atoms is preferred. The more preferred is an alkyl group of 1 or 2 carbon atoms. The monomers of general formula (1) can be used each independently or in a combination of two or more species.

The alkyl acrylate and/or alkyl methacrylate monomer unit (b) containing not less than 9 carbon atoms in its alkyl moiety can be represented by the general formula (2):

$$CH_2=C(R^5)COOR^7 \quad (2)$$

(wherein $R^5$ is as defined above; $R^7$ represents an alkyl group of not less than 9 carbon atoms)

Referring to $R^7$ in the above general formula (2), there can be mentioned nonyl, lauryl, tridecyl, cetyl, stearyl, $C_{22}$ alkyl, biphenyl group and so forth. Usually, long-chain alkyl groups of 9 to 30 carbon atoms are employed and those of 10 to 20 carbon atoms are preferred. The monomers represented by the general formula (2) can be used each independently or in a combination of two or more species, for example, a mixture of $C_{12}$ and $C_{13}$ alkyl groups.

The molecular chain of the acrylic copolymer (B) substantially consists of monomer units (a) and (b). The term "substantially consist of monomer units (a) and (b)" as used here means that the proportion of monomer units (a) and (b) existing in the acrylic copolymer (B) becomes larger than 50%, preferably not less than 70%. If the proportion of monomer units (a) and (b) is less than 50%, the compatibility between the oxyalkylene polymer component (A) and the acrylic copolymer component (B) is so poor that opacification may occur and, at the same time, adhesive characteristics tend to be deteriorated.

Furthermore, the ratio of monomer unit (a) to the total amount of monomer unit (a) and monomer unit (b) is preferably between 40 and 95% by weight, more preferably between 60 and 90% by weight. If the ratio is greater than 95% by weight, the compatibility will be decreased. If it is smaller than 40% by weight, the cost will be increased.

In addition to said alkyl acrylate and/or alkyl methacrylate monomer units, the acrylic copolymer (B) may contain other copolymerizable units. Thus, for example, there can be mentioned acrylic acid compounds such as acrylic acid and methacrylic acid; amide group-containing acrylic monomers such as acrylamide, methacrylamide, N-methylolacrylamide and N-methylolmethacrylamide; epoxy group-containing acrylic monomers such as glycidyl acrylate and glycidyl methacrylate; amino group-containing acrylic monomers such as diethylaminoethyl acrylate, diethylaminoethyl methacrylate and aminoethyl vinyl ether; polyoxyethylene acrylate, polyoxyethylene methacrylate, and so on. These compounds are expected to provide a favorable effect of copolymerization in terms of moisture curability and internal curability. Aside from the above, monomer units derived from acrylonitrile, styrene, α-methylstyrene, alkyl vinyl ethers, vinyl chloride, vinyl acetate, vinyl propionate, ethylene, etc. may also be formulated.

It is general for one skilled in the art that the monomeric composition of the acrylic copolymer (B) can be selected according to the intended use and object. For uses and objects calling for strength, for instance, the composition with a comparatively high softening point is preferred. Thus, a composition with a softening point not below 0° C., more preferably not below 20° C., is preferred.

For objects and uses with emphasis on viscosity and workability, for instance, conversely a composition with a comparatively low softening point is preferred. Thus, a composition having a softening point not over 20° C., more preferably not over 0° C., still more preferably not over −20° C., is advantageous.

The molecular weight of the acrylic copolymer (B) is not particularly restricted. However, from the standpoint of the ease of polymerization, a copolymer having a number average molecular weight of 500 to 100,000, as measured by GPC relative to polystyrene standard, is advantageous. A copolymer having a number average molecular weight of 1,000 to 30,000 is more preferred from the standpoint of balance between strength and viscosity, while a copolymer having a number average molecular weight of 1,000 to 20,000 is preferred from the standpoint of workability or ease of handling.

The acrylic copolymer (B) can be produced by the conventional vinyl polymerization technology. For example, it can be produced by the radical solution polymerization or bulk polymerization method but these methods are not exclusive choices. The polymerization reaction is generally carried out by reacting said monomers in the presence of a radical initiator, a chain transfer agent and a solvent at a temperature of 50 to 150° C.

The radical initiator mentioned above includes azobisisobutyronitrile, benzoyl peroxide, etc. and the chain transfer agent includes mercaptan compounds, for example, n-dodecylmercaptan, t-dodecylmercaptan, laurylmercaptan, etc., halogen-containing compounds, and so on. The solvent is preferably selected from among inert solvents such as ethers, hydrocarbons and esters.

A variety of techniques are available for introducing a reactive silyl group into the acrylic copolymer (B). For example, there can be mentioned the process which comprises copolymerizing a compound containing a polymerizable unsaturated bond and a reactive silyl group with said monomers (a) and (b) (Technique 1), the process which comprises copolymerizing a compound containing a polymerizable unsaturated bond and a reactive functional group (hereinafter referred to as Y group) (for example, acrylic acid, hydroxyethyl methacrylate, or the like) with said monomers (a) and (b), and reacting the resulting copolymer with a compound containing a reactive silyl group and a functional group (hereinafter referred to as Y' group) capable of reacting with said Y group (Technique 2), the process which comprises copolymerizing said monomers (a) and (b) in the presence of a reactive silyl group-containing mercaptan compound serving as a chain transfer agent (Technique 3), the process which comprises copolymerizing said monomers (a) and (b) using a reactive silyl group-containing azobisnitrile compound or disulfide compound as an initiator (Technique 4), the process which comprises polymerizing said monomers (a) and (b) by the living radical polymerization method and introducing a reactive silyl group into the molecular terminus of the copolymer (Technique 5). It should, however, be understood that these techniques are not exclusive choices and that optionally the above processes (Techniques 1 to 5) may be used in a suitable combination. Taking the combination of (Technique 1) and (Technique 3) as an example, there can be mentioned the process which comprises copolymerizing a compound containing a polymerizable unsaturated bond and a reactive silyl group with said monomers (a) and (b) in the presence of a reactive silyl group-containing mercaptan compound capable of acting as a chain transfer agent.

The compound containing a polymerizable unsaturated bond and a reactive silyl group as referred to above in connection with (Technique 1) is represented by the following general formula (3) or general formula (4).

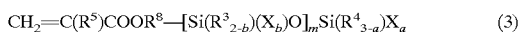

$$CH_2=C(R^5)COOR^8-[Si(R^3{}_{2-b})(X_b)O]_mSi(R^4{}_{3-a})X_a \quad (3)$$

(wherein $R^5$ is as defined above; $R^8$ represents a bivalent alkylene group of 1 to 6 carbon atoms; $R^3$, $R^4$, X, a, b, and m are as defined above)

$$CH_2=C(R^5)-[Si(R^3{}_{2-b})(X_b)O]_mSi(R^4{}_{3-a})X_a \quad (4)$$

(wherein $R^3$, $R^4$, $R^5$, X, a, b, and m are as defined above)

As examples of $R^8$ in the above general formula (3), alkylene groups of 1 to 6 carbon atoms, preferably those of 1 to 4 carbon atoms, such as methylene, ethylene, propylene, can be mentioned.

As examples of the hydrolyzable group X in the general formula (3) or (4), there can be mentioned a halogen atom, a hydrogen atom, and alkoxy, acyloxy, ketoximato, amino, amido, aminoxy, mercapto, and alkenyloxy groups. Among these, in view of the mild hydrolyzability, alkoxy groups such as methoxy and ethoxy are preferred. Monomers of the general formula (3) or (4) may be used each independently or in a combination of two or more species.

The compound containing a polymerizable unsaturated bond and a reactive silyl group as represented by the general formula (3) or (4) includes, but is not limited to, γ-methacryloxypropyl(alkyl)polyalkoxysilanes such as γ-methacryloxypropyltrimethoxysilane, γ-methacryloxypropylmethyldimethoxysilane and γ-methacryloxypropyltriethoxysilane; γ-acryloxypropyl(alkyl)polyalkoxysilanes such as γ-acryloxypropyltrimethoxysilane, γ-acryloxypropylmethyldimethoxysilane and γ-acryloxypropyltriethoxysilane; vinyl (alkyl)polyalkoxysilanes such as vinyltrimethoxysilane, vinylmethyldimethoxysilane, and vinyltriethoxysilane; and so on.

As the Y and Y' groups referred to above in connection with (Technique 2), various combinations of groups can be employed. For example, the combination of an amino group, a hydroxyl group or a carboxylic group for Y group and an isocyanato group for Y' group can be mentioned. As an alternative combination of groups, an allyl group for Y group and a hydrosilyl group (H—Si) for Y' group can be mentioned as described in Japanese Kokai Publication Sho-54-36395, Japanese Kokai Publication Hei-01-272654 and Japanese Kokai Publication Hei-02-214759. In this combination, the Y and Y' groups may be bound to each other by a hydrosilylation reaction in the presence of a Group VIII transition metal.

The reactive silyl group-containing mercaptan for use as a chain transfer agent in the case of (Technique 3) includes γ-mercaptopropyltrimethoxysilane, γ-mercaptopropylmethyldimethoxysilane, γ-mercaptopropyltriethoxysilane, and so on. Furthermore, as described in Japanese Kokai Publication Sho-59-78222, there can be used the process in which the monomers (a) and (b) are copolymerized in the presence of a bifunctional radically polymerizable compound and, as a chain transfer agent, an alkoxysilyl group-containing mercaptan.

The reactive silyl group-containing azobisnitrile compound and disulfide compound referred to above in connection with (Technique 4) include the alkoxysilyl group-containing azobisnitrile compounds and alkoxysilyl group-containing disulfide compounds described in, inter alia, Japanese Kokai Publication Sho-60-23405 and Japanese Kokai Publication Sho-62-70405.

Referring to (Technique 5), the process described in Japanese Kokai Publication Hei-09-272714, for instance, can be mentioned.

Aside from the above techniques, the technique involving the use of a reactive silyl group-containing mercaptan in combination with a reactive silyl group-containing radical polymerization initiator as described in, inter alia, Japanese Kokai Publication Sho-59-168014 and Japanese Kokai Publication Sho-60-228516 can be mentioned.

In the practice of the present invention, it is important that both dialkoxysilyl groups and trialkoxysilyl groups should be contained as the reactive silyl groups in the acrylic polymer (B). When all the reactive silyl groups occurring in the acrylic polymer (B) are dialkoxysilyl groups, the curable composition comprising the reactive silyl group-containing oxyalkylene polymer (A), acrylic copolymer (B), and cure accelerating catalyst (C) is satisfactory in storage stability and adhesiveness but tends to be undesirably low in the cure rate. When all the reactive silyl groups occurring in the acrylic copolymer (B) are trialkoxysilyl groups, the curable composition comprising said (A) component, (B) component, and (C) component is improved in cure rate but because of the high activity of the trialkoxysilyl function, the storage stability of the composition is sacrificed and the adhesiveness to plastics, such as polycarbonate resin, tends to be decreased; thus, it is not preferred.

The technology of introducing both dialkoxysilyl and trialkoxysilyl groups into the acrylic copolymer (B) includes (1) the method which comprises using an acrylic copolymer containing both a dialkoxysilyl group and a trialkoxysilyl group, as said acrylic copolymer (B) and (2) the method which comprises using a compound containing a dialkoxysilyl group, in admixture with a compound containing a trialkoxysilyl group. Aside from the above methods, it is also possible to use a method comprising a combination of (1) and (2), for example, using an acrylic copolymer containing a dialkoxysilyl groups and a trialkoxysilyl groups within the molecule in admixture with an acrylic copolymer containing a dialkoxysilyl group, or an acrylic copolymer containing a trialkoxysilyl group.

The method (2) includes the version which comprises producing two or more kinds of acrylic copolymers independently and, then, blending them, the version which comprises producing a dialkoxysilyl group-containing acrylic copolymer in the first place and then producing a trialkoxysilyl group-containing acrylic copolymer by polymerization in situ, and the version which comprises the reverse of the above procedure, and each of these versions can be selected according to the production equipment available and other conditions.

The dialkoxysilyl group for the acrylic copolymer (B) according to the present invention can be freely selected from among the species which can be introduced by the above production technology with reference to the required characteristics, but in consideration of the availability of raw material, it is preferable to use a species selected from the group consisting of methyldimethoxysilyl, methyldiethoxysilyl and methyldiisopropenyloxysilyl group. It is particularly advantageous to use methyldimethoxysilyl group.

The trialkoxysilyl group for the acrylic copolymer (B) according to the present invention can be freely selected from among the species which can be introduced by the above production technology with reference to the required characteristics, but in consideration of the availability of raw material, it is preferable to use a member selected from the group consisting of trimethoxysilyl, triethoxysilyl and triisopropenyloxysilyl group. In view of the balance between cure rate and storage stability, trimethoxysilyl and triethoxysilyl group are more preferred and trimethoxysilyl group is particularly preferred.

From the standpoint of characteristics of cured product, the average number of reactive silyl groups to be contained in the acrylic copolymer (B) per molecule should be at least 0.2 trialkoxysilyl groups and at least 0.2 dialkoxysilyl groups. More preferably the acrylic copolymer (B) contains an average of not less than 0.3 trialkoxysilyl groups and an average of not less than 0.3 dialkoxysilyl groups per molecule.

The total number of reactive silyl groups occurring per molecule is preferably not less than 0.4 but less than 10 on the average, more preferably not less than 0.5 but less than 5 on the average. When the total number of reactive silyl groups to be contained per molecule is less than 0.4 on the average, the proportion of acrylic copolymer molecules not undergoing crosslinking is increased to cause undesirable phenomena such as bleeding. When the average number is 10 or more, the use of such a reactive silyl group-containing compound in a large quantity results in an increased production cost and a drastic reduction in curability.

Furthermore, in the curable composition essentially comprising the reactive silyl group-containing oxyalkylene polymer (A), acrylic copolymer (B) and cure accelerating catalyst (C) according to the present invention, it is important to judiciously select the kinds and numbers of reactive silyl groups to be contained in the oxyalkylene polymer (A) and acrylic copolymer (B) in order that cured physical properties, cure rate, storage stability, and adhesiveness may all be properly reconciled. When dimethoxysilyl and trimethoxysilyl groups are used as reactive silyl groups, the mole percentage of trimethoxysilyl groups based on all reactive silyl groups is preferably not less than 5% but less than 50%, more preferably not less than 10% but less than 40%, from the standpoint of cure rate, storage stability and others. When the proportion of trimethoxysilyl groups is less than 5%, there is no improvement in the cure rate and other parameters while exceeding 50% makes it difficult to secure sufficient storage stability.

The ratio of oxypropylene polymer (A) and acrylic copolymer (B) in the composition of the present invention can be selected from the range of 3 to 300 weight parts of acrylic copolymer (B) relative to 100 weight parts of oxypropylene polymer (A). However, the preferred range from the standpoint of improving the cure rate is 5 to 150 weight parts, and the still more preferred range taking cure rate, storage stability, adhesiveness and weatherability into consideration is 15 to 100 weight parts. Usually the ratio referred to above is selected according to the intended use and expected performance characteristics. It is well known to those skilled in the art that the optimum corresponding ratio for the conventional curable composition varies with the molecular weight and reactive silyl group content of the acrylic polymer component.

The cure accelerating catalyst for use as the (C) component is now described.

As the cure accelerating catalyst for use as the (C) component according to the invention, a silanol condensation catalyst, which is conventionally used to accelerate the reaction of a reactive silyl group, is employed. Representative of such cure accelerators are tin compounds, particularly organotin compounds.

The organotin compound referred to above includes, but is not limited to, dibutyltin dicarboxylates, such as dibutyltin dilaurate and dibutyltin bis(alkyl maleate); dialkyltin alkoxide derivatives such as dibutyltin dimethoxide and dibutyltin diphenoxide; intramolecular coordination derivatives of dialkyltins, such as dibutyltin diacetylacetonate and dibutyltin acetoacetate; reaction mixtures of dibutyltin oxide with ester compounds; reaction mixtures of dibutyltin oxide with silicate compounds, and tetravalent dialkyltin oxide derivatives such as oxy derivatives of said dialkyltin oxide derivatives; and so on.

Furthermore, in the practice of the invention, a cure accelerating catalyst other than organotin compounds may likewise be used as said cure-accelerating catalyst (C).

The cure accelerating catalyst other than organotin compounds which can be employed in the invention is not particularly restricted but includes, among others, the combination of a tin compound exclusive of organotin compound and an organic acid, the combination of an organic acid and an amine, and non-tin compounds such as organic acid salts, or organometal compounds of Group 3B or 4A metals.

The tin compound exclusive of organotin compound as referred to above includes tin(II) carboxylates such as stannous octoate, stannous oleate, stannous stearate, stannous versatates, and so forth. The combination of such a tin(II) carboxylate and an amine is highly active and preferred for conserving the catalyst.

The non-tin series cure accelerating catalyst includes organic acids, such as organic carboxylic acids, organic sulfonic acids and acidic phosphate esters, among others.

The organic carboxylic acid referred to above includes aliphatic carboxylic acids, such as acetic acid, oxalic acid, butyric acid, tartaric acid, maleic acid, octylic acid and oleic acid; and aromatic carboxylic acids such as phthalic acid, trimellitic acid, and so on. In terms of activity, aliphatic carboxylic acids are preferred.

The organic sulfonic acid referred to above includes toluenesulfonic acid and styrenesulfonic acid, among others.

The acidic phosphate ester referred to above is a phosphoric acid ester containing an —O—P(=O)OH moiety and includes those specific acidic phosphates which are mentioned hereunder. Organic acidic phosphate compounds are preferred from compatibility and cure-catalyzing activity points of view.

The organic acidic phosphate ester is represented by the formula $(R-O)_d-P(=O)(-OH)_{3-d}$ (wherein d is equal to 1 or 2; R represents an organic residue).

The following is a partial list of such compounds. $(CH_3O)_2-P(=O)(-OH)$, $(CH_3O)-P(=O)(-OH)_2$, $(C_2H_5O)_2-P(=O)(-OH)$, $(C_2H_5O)-P(=O)(-OH)_2$, $(C_3H_7O)_2-P(=O)(-OH)$, $(C_3H_7O)-P(=O)(-OH)_2$, $(C_4H_9O)_2-P(=O)(-OH)$, $(C_4H_9O)-P(=O)(-OH)_2$, $(C_8H_{17}O)_2-P(=O)(-OH)$, $(C_8H_{17}O)-P(=O)(-OH)_2$, $(C_{10}H_{21}O)_2-P(=O)(-OH)$, $(C_{10}H_{21}O)-P(=O)(-OH)_2$, $(C_{13}H_{27}O)_2-P(=O)(-OH)$ $(C_{13}H_{27}O)-P(=O)(-OH)_2$, $(C_{16}H_{33}O)_2-P(=O)(-OH)$, $(C_{16}H_{33}O)-P(=O)(-OH)_2$, $(HO-C_6H_{12}O)_2-P(=O)(-OH)$, $(HO-C_6H_{12}O)-P(=O)(-OH)_2$, $(HO-C_8H_{16}O)-P(=O)(-OH)$, $(HO-C_8H_{16}O)-P(=O)(-OH)_2$, $\{(CH_2OH)(CHOH)O\}_2-P(=O)(-OH)$, $\{(CH_2OH)(CHOH)O\}-P(=O)(-OH)_2$, $\{(CH_2OH)(CHOH)C_2H_4O\}_2-P(=O)(-OH)$, $\{(CH_2OH)(CHOH)C_2H_4O\}-P(=O)(-OH)_2$, and so forth.

The use of said organic acid compound in combination with an amine compound is more preferred in that the resulting gain in activity is conducive to savings in catalyst material. Among various combinations of organic acid compounds with amines, the preferred are the combination of an acidic phosphate ester with an amine and the combination of an organic carboxylic acid with an amine. The combination of an organic acidic phosphate ester with an amine compound and the combination of an aliphatic carboxylic acid with an amine compound have enhanced activity and are particularly preferred in terms of rapid curability.

The amine compound includes but is not limited to butylamine, octylamine, laurylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole, 1,8-diazabicyclo[5.4.0]undecene-7 (DBU), and so on.

The carboxylates of metals other than tin include, among others, calcium carboxylates, zirconium carboxylates, iron carboxylates, vanadium carboxylates, bismuth carboxylates, bismuth salts such as bismus tris (2-ethylhexanoate) and bismuth tris (neodecanoate); lead carboxylates, titanium carboxylates, nickel carboxylates, etc., wherein the carboxylic acid moieties include octylic acid, oleic acid, naphthenic acid, stearic acid and so forth. The use of such a metal carboxylate in combination with an amine is preferred because of enhanced activity that can be attained and the resulting reduction in catalyst requirements.

As the organometal compounds other than tin compounds, there can be mentioned organometal compounds containing Group 3B or 4A metals. In terms of activity, organotitanate compounds, organoaluminum compounds, organozirconium compounds, organoboron compounds, etc. are preferred, although these are not exclusive choices.

The organotitanate compound referred to above includes tetraisopropyl titanate, tetrabutyl titanate, tetramethyl titanate, tetra-2-ethylhexyl titanate, titanium alkoxides such as triethanolamine titanate; titanium chelate compounds, such as titanium tetraacetylacetonate, titanium ethylacetoacetate, octylene glycol titanate ester, titanium lactate and so on.

The organoaluminum compound referred to above includes aluminum alkoxides such as aluminum isopropoxide, mono-sec-butoxyaluminum diisopropoxide, and aluminum sec-butoxide, and aluminum chelate compounds, such as aluminum tris(acetylacetonate), aluminum tris(ethyl acetoacetate) and diisopropoxyaluminum ethylacetoacetate; and so forth.

The organozirconium compound referred to above includes zirconium alkoxides such as zirconium tetraisopropoxide, zirconium tetra-n-propoxide and zirconium n-butoxide; and zirconium chelate compounds, such as zirconium tetraacetylacetonate, zirconium monoacetylacetonate, zirconium bisacetylacetonate, zirconium acetylacetonato-bis-etylacetoacetate and zirconium acetate; and so forth.

These organotitanate compounds, organoaluminum compounds, organozirconium compounds, organoboron compounds, etc. may optionally be used in combination but the use of these compounds in combination with said amine compound or acidic phosphate ester compound is more preferred not only because enhanced activity and, hence, savings in catalyst material may be realized but also because improved curability at elevated temperature and control of the pot life at room temperature can be expected.

The level of use of the cure accelerating catalyst (C) can be freely selected according to the intended use and expected performance but, based on 100 weight parts of the oxypropylene polymer (A) and acrylic copolymer (B) combined, the amount of (C) is preferably 0.01 to 20 weight parts, more preferably 0.1 to 10 weight parts from cost points of view, and most preferably 0.25 to 5 weight parts from the standpoint of the balance between curability and dynamic characteristics such as creep.

For the composition of the present invention, the common plasticizers can be employed. As specific examples, there can be mentioned phthalic esters such as dibutyl phthalate, diheptyl phthalate, di(2-ethylhexyl)phthalate, butyl benzyl phthalate and butyl phthalylbutyl glycolate; non-aromatic dibasic acid esters such as dioctyl adipate and dioctyl sebacate,; phosphate esters such as tricresyl phosphate and tributyl phosphate, among others. Among these, phthalic ester series plasticizers are most preferred from performance and economic points of view. However, the recent trend is that the use of phthalic ester series plasticizers, particularly di(2-ethylhexyl) phthalate which has been universally employed, is refrained for safety and hygienic reasons. Not only from performance points of view but also for safety and hygienic reasons, a high molecular weight plasticizer in lieu of a low molecular weight one is preferred. The high molecular plasticizer includes, among others, polyester plasticizers such as the polyesters synthesized from a dibasic acid and polyhydric alcohol; liquid acrylic resin series plasticizers; polyethers such as polypropylene glycol or its derivatives; and polystyrenes such as poly-α-methylstyrene, polystyrene and the like. As specific examples, Excenol 5030 from Asahi Glass Co. (a polyether polyol with a molecular weight of about 5,100) and SGO which is an oxypropylene polymer having an allyl ether group at either terminus and having a molecular weight of 5,200 and a Mw/Mn ratio of 1.6 (Johnson Polymer) may be mentioned.

If necessary, the composition of the invention may be supplemented with filler and/or other additives before application.

The filler mentioned above includes, but is not limited to, heavy calcium carbonate, light calcium carbonate, calcium carbonate gel, kaolin, talc, silica, titanium dioxide, aluminum silicate, magnesium oxide, zinc oxide, and carbon black. When the filler is used, its level of use is preferably 5 to 300 weight parts relative to 100 weight parts of the acrylic-modified silyl-terminated polyether resin (A+B components) and, in terms of the balance between viscosity and mechanical properties, is more preferably 10 to 150 weight parts on the same basis.

As the other additives referred to above, antisagging agents such as hydrogenated castor oil and organic bentonite; colorants, antioxidants and tackifiers, among others, can be mentioned.

For improved adhesiveness and storage stability, the curable composition of the present invention may be supplemented with a silane coupling agent such as N-(β-aminoethyl)-γ-aminopropylmethyldimethoxysilane, γ-aminopropyltrimethoxysilane, γ-aminopropyltriethoxysilane, vinyltrimethoxysilane, γ-glycidoxypropyltrimethoxysilane or N-(β-aminoethyl)-γ-aminopropyltrimethoxysilane.

Furthermore, in the curable composition of the invention, an epoxy resin, and a curing agent therefor, a viscosity modifier, and other additives may also be formulated.

The epoxy resin mentioned just above may be liberally selected from among the known epoxy resins, for example bisphenol A epoxy resin, bisphenol F epoxy resin, nonflammable epoxy resin such as tetrabromobisphenol A glycidyl ether, novolak epoxy resin, hydrogenated bisphenol A epoxy resin, bisphenol A-propylene oxide adduct glycidyl ether epoxy resin, diglycidyl-p-oxybenzoic diglycidyl ester epoxy resin, diglycidyl phthalate such as diglycidyl tetrahydrophthalate and diglycidyl hexahydrophthalate epoxy resins, m-aminophenol epoxy resin, diaminodiphenylmethane epoxy resin, urethane-modified epoxy resin, various alicyclic epoxy resins, N,N-diglycidylaniline, N,N-diglycidyl-o-toluidine, triglycidyl isocyanurate, polyalkylene glycol diglycidyl ether, glycerol and other polyhydric alcohol glycidyl ethers, hydantoin type epoxy resin, and epoxides of petroleum resin and other unsaturated polymers. Among the various epoxy resins mentioned above, the resins having at least two epoxy groups within the molecule are preferred because these are more reactive and more readily give a three-dimensional network on curing. The more preferred epoxy resin includes bisphenol A epoxy resin, bisphenol F epoxy resin, novolak epoxy resin, and diglycidyl phthalate epoxy resin.

As the curing agent for epoxy resins, the known epoxy curing agents can be liberally employed. Thus, the curing agent which can be used includes various amines such as triethylenetetramine, tetraethylenepentamine, diethylaminopropylamine, N-aminoethylpiperazine, m-phenylenediamine, p-phenylenediamine, diaminodiphenylmethane, diaminodiphenyl sulfone, isophoronediamine and 2,4,6-tris (dimethylaminomethyl) phenol; tertiary amine salts, polyamide resins, latent curing agents such as ketimines, aldimines and enamines; imidazoles, dicyandiamides, boron trifluoride complex compounds, carboxylic anhydrides such as phthalic anhydride, hexahydrophthalic anhydride, tetrahydrophthalic anhydride, endomethylenetetrahydrophthalic anhydride, dodecynylsuccinic anhydride, pyromellitic anhydride and chlorendic anhydride; alcohols, phenols, carboxylic acids and the like.

The viscosity modifier mentioned above includes, but is not limited to, gelling agents such as dibenzylidenesorbitol and tribenzylidenesorbitol, and fatty acid amides such as amide wax.

As the other additives, various pigments, antioxidants, ultraviolet absorbers, etc. can be mentioned.

The composition of the invention, obtained in the above manner, can be used with advantage as adhesives, pressure sensitive adhesives, coatings, painted surface water-proofing agents, sealant compositions, materials for template, casting rubber materials, foam materials or the like. It is particularly useful as sealants or adhesives, among the above-mentioned uses.

The curable composition of the invention is especially useful as an elastic sealant, particularly as an architectural sealant, e.g. a siding board sealant, a grazing sealant, etc., and can be applied to a sealing material for buildings, ships, motor vehicles, roads, and so on. Furthermore, either used alone or with the aid of a primer, the composition is capable of adhering intimately to a large variety of adherends inclusive of shaped articles of glass, porcelain, ceramics, wood, metal or resin, thus the composition can be applied to a sealing composition or an adhesive composition in many different fields. As the adhesive, the composition can be used as a one-package system or a two-package system, or as a contact adhesive for bonding after an open time, a pressure sensitive adhesive, or the like. In addition, it is of use as a coating, a painted surface waterproofing agent, a food packaging material, a casting rubber material, a material for template, and a foam material.

The adhesive comprising the curable composition of the invention is elastic and adherend to various adherends inclusive of metals such as sheet steel, SUS, copper, aluminum; the corresponding coated metals as surface-treated with an epoxy, acrylic, silicate and silicone, or fluorine-containing resin, plastic materials such as polycarbonates, acrylics, ABS, styrene foam, urethane foam and FRP; wood, and inorganic materials such as glass, concrete, mortar, calcium silicate boards, ceramic tiles and so forth. Therefore, the above bonding method can be advantageously exploited in a broad range of uses, for example, bonding of plastic and metal parts in car bodies or electrical appliances, fabrication of honeycombs panels, bonding of tiles to concrete panels and other substrate surfaces or bonding of panels, and inter-adhesiveness of a foam material and a board material in buildings and cars.

The curable composition of the invention is so excellent in weatherability that it can be used in applications where it is expected to double as an adhesive and a sealant or applications requiring weatherability because of partial exposure of the adhesive-applied surface on the adherend surface or to sunlight. By way of illustration, the composition can be used for the jointless bonding of tiles or panels and the bonding of transparent adherends such as glass, acrylic resin and carbonate resin.

EXAMPLES

Example of Synthesis—1

To a polyoxypropylene triol (Mn=19,000 and Mw/Mn=1.4) obtained by reacting propylene oxide using a polyoxypropylenetriol of Mn=3,000 as an initiator in the presence of zinc hexacyanocobaltate-glyme complex catalyst was added a methanol solution of sodium methoxide, and the methanol was then distilled off under reduced pressure, whereby the terminus of the polypropylene oxide was converted to the sodium alkoxide. Then, allyl chloride was caused to react and the unreacted allyl chloride was removed for purification to give an allyl-terminated polypropylene oxide. This reaction product was further reacted with the hydrosilyl compound methyldimethoxysilane in the presence of a platinum catalyst to give a methyldimethoxysilyl-terminated polypropylene oxide. The viscosity of the methyldimethoxysilyl-terminated polypropylene oxide at 23° C. was 28 Pa·s.

Example of Synthesis—2

To 900 g of a polyoxypropylene glycol (Mn=2, 000) and 100 g of a polyoxypropylenetriol (Mn=3,000) was added a methanol solution of sodium methoxide, and the methanol was then distilled off under reduced pressure, whereby the terminus of the polypropylene oxide was converted to the sodium alkoxide. Thereafter, dichloromethane was added for molecular weight escalation. Then, allyl chloride was caused to react and the unreacted allyl chloride was removed for purification to give an allyl-terminated polypropylene oxide of Mn=ca 12,000 and Mw/Mn=2.3. This reaction product was further reacted with the hydrosilyl compound methyldimethoxysilane in the presence of a platinum catalyst to give a methyldimethoxysilyl-terminated polypropylene oxide. The viscosity of the methyldimethoxysilyl-terminated polypropylene oxide at 23° C. was 22 Pa·s.

Examples of Synthesis—3 to 10

According to the examples of synthesis described in Japanese Kokai Publication Sho-63-112642, reactive silyl group-containing acrylic copolymers for use as the (B) component were synthesized. The solvent mentioned in Table 1 was heated to 110° C. and a solution of the polymerization initiator in the monomer mixture shown in Table 1 was added dropwise over 6 hours and the post-polymerization reaction was carried out for 2 hours. In this manner, acrylic resin solutions according to Examples of Synthesis—3 to 10 were prepared.

TABLE 1

|  | Ex. of Synthesis - 3 | Ex. of Synthesis - 4 | Ex. of Synthesis - 5 | Ex. of Synthesis - 6 | Ex. of Synthesis - 7 | Ex. of Synthesis - 8 | Ex. of Synthesis - 9 | Ex. of Synthesis - 10 |
|---|---|---|---|---|---|---|---|---|
| Butyl acrylate | 784 | 784 | 784 | 250 | 400 | 250 | 250 | 450 |
| Methyl methacrylate | 23 | 23 | 23 | 600 | 500 | 600 | 600 | 500 |
| Stearyl methacrylate | 150 | 150 | 150 | 50 | 0 | 50 | 50 | 0 |
| γ-Methacryloxypropyl- | 10 | 0 | 20 | 50 | 50 | 0 | 100 | 30 |

TABLE 1-continued

| | Ex. of Synthesis - 3 | Ex. of Synthesis - 4 | Ex. of Synthesis - 5 | Ex. of Synthesis - 6 | Ex. of Synthesis - 7 | Ex. of Synthesis - 8 | Ex. of Synthesis - 9 | Ex. of Synthesis - 10 |
|---|---|---|---|---|---|---|---|---|
| trimethoxysilane | | | | | | | | |
| γ-Methacryloxypropyl-methyldimethoxysilane | 10 | 20 | 0 | 50 | 50 | 100 | 0 | 20 |
| n-Dodecylmercaptan | | | | 70 | 70 | 70 | 70 | 70 |
| Azobisisobutyronitrile | 15 | 15 | 15 | | | | | |
| Azobis-2-methylbutyronitrile | | | | 20 | 20 | 20 | 20 | 20 |
| Xylene | 666 | 666 | 666 | | | | | |
| Toluene | | | | 700 | 700 | 700 | 700 | 700 |
| Number average molecular weight*[1] | 11800 | 11500 | 12100 | 1600 | 1600 | 1800 | 1600 | 1600 |

*[1]As determined by GPC

Example of Synthesis—11

To a polyoxypropylene triol (Mn=11,000 and Mw/Mn=1.1) obtained by reacting propylene oxide using a polyoxypropylene glycol of Mn=2,000 as an initiator in the presence of zinc hexacyanocobaltate-glyme complex catalyst was added a methanol solution of sodium methoxide, and the methanol was then distilled off under reduced pressure, whereby the terminus of the polypropylene oxide was converted to sodium alkoxide. Then, allyl chloride was caused to react and the unreacted allyl chloride was removed for purification to give an allyl-terminated polypropylene oxide. This reaction product was further reacted with the hydrosilyl compound methyldimethoxysilane in the presence of a platinum catalyst to give a methyldimethoxysilyl-terminated polypropylene oxide. The viscosity of the above methyldimethoxysilyl-terminated polypropylene oxide at 23° C. was 8 Pa·s.

Example 1

To the acrylic resin solution obtained in Example of Synthesis—3 was added the reactive silyl group-containing oxyalkylene polymer prepared in Example of Synthesis—1 portionwise under stirring until a predetermined weight part (solid content concentration) was attained. Then, the xylene was distilled off on a rotary evaporator to give an acrylic-modified silyl-terminated polyether resin composition. Using each of the compositions thus obtained, the evaluations indicated in Table 2 were carried out.

Comparative Examples 1 or 2

Using the acrylic-modified silyl-terminated polyether silicone resin compositions prepared in the same manner as in Example 1, the evaluations indicated in Table 2 were carried out.

TABLE 2

| | Example 1 | Comparative Example 1 | Comparative Example 2 |
|---|---|---|---|
| Ex. of Synthesis - 1 | 70 | 70 | 70 |
| Ex. of Synthesis - 3 | 30 | 0 | 0 |
| Ex. of Synthesis - 4 | 0 | 30 | 0 |
| Ex. of Synthesis - 5 | 0 | 0 | 30 |
| Acrylate-modified silicone (total) | 100 | 100 | 100 |
| Calcium carbonate | 50 | 50 | 50 |
| Vinyltrimethoxysilane | 2 | 2 | 2 |
| Acidic phosphate ester*[2] | 1.5 | 1.5 | 1.5 |
| TBZR*[3] | 0.5 | 0.5 | 0.5 |
| Viscosity gain (%) after 30 days at 50° C. | 1.2 | 1.2 | not less than 1.3 |
| Tack-free time (min.) | 60 | 75 | 50 |

*[2]Dibutyl phosphate (DP-4 ™, product of Daihachi Chemical)
*[3]Tetrabutoxyzirconium (TBZR ™, product of Nippon Soda)

The viscosity of each sample immediately after preparation and that of the sample after 30 days' standing at 50° C. in a nitrogen-purged vessel were measured with a Type B viscometer at 23° C. and the percentage viscosity gain was calculated from the two values. The tack-free time shown is the interval time until the resin did not adhere to the fingertip any longer.

Examples 2 to 5

Using acrylic-modified silyl-terminated polyether resin compositions prepared in the same manner as in Example 1, the evaluations indicated in Table 3 were carried out.

Comparative Examples 3 to 6

Using the acrylic-modified silyl-terminated polyether resin compositions prepared in the same manner as in Example 1, the evaluations indicated in Table 3 were carried out.

TABLE 3

| | Example 2 | Example 3 | Example 4 | Example 5 | Comparative Example 3 | Comparative Example 4 | Comparative Example 5 | Comparative Example 6 |
|---|---|---|---|---|---|---|---|---|
| Ex. of Synthesis - 2 | 60 | 60 | 60 | 30 | 60 | 60 | 0 | 0 |
| Ex. of Synthesis - 11 | 0 | 0 | 0 | 30 | 0 | 0 | 60 | 60 |

TABLE 3-continued

|  | Example 2 | Example 3 | Example 4 | Example 5 | Comparative Example 3 | Comparative Example 4 | Comparative Example 5 | Comparative Example 6 |
|---|---|---|---|---|---|---|---|---|
| Ex. of Synthesis - 6 | 40 | 0 | 0 | 40 | 0 | 0 | 0 | 0 |
| Ex. of Synthesis - 7 | 0 | 40 | 0 | 0 | 0 | 0 | 0 | 0 |
| Ex. of Synthesis - 8 | 0 | 0 | 30 | 0 | 40 | 0 | 0 | 0 |
| Ex. of Synthesis - 9 | 0 | 0 | 10 | 0 | 0 | 40 | 40 | 0 |
| Ex. of Synthesis - 10 | 0 | 0 | 0 | 0 | 0 | 0 | 0 | 40 |
| Acrylate-modified silicone (total) | 100 | 100 | 100 | 100 | 100 | 100 | 100 | 100 |
| Calcium carbonate | 50 | 50 | 50 | 50 | 50 | 50 | 50 | 50 |
| N-(β-aminoethyl)-γ-aminopropyltrimethoxysilane | 2 | 2 | 2 | 2 | 2 | 2 | 2 | 2 |
| Vinyltrimethoxysilane | 3 | 3 | 3 | 3 | 3 | 3 | 3 | 3 |
| Neostan U-220*[5] | 2 | 2 | 2 | 2 | 2 | 2 | 2 | 2 |
| Skin formation time (min) | 10 | 10 | 25 | 15 | 60 | within 10 | within 10 | 25 |
| Adhesive strength under shear (adherend: polycarbonate) | 5.0 MPa Cohesive failure | 4.8 MPa Cohesive failure | 4.5 MPa Cohesive failure | 5.2 MPa Cohesive failure | 4.7 MPa Cohesive/adhesive failure | 1.2 MPa Adhesive failure | 1.8 MPa Adhesive failure | 3.0 MPa Adhesive failure |

*[5]Dibutyltin bis-(acetylacetonate), product of Nitto Kasei

The skin formation time was assessed by confirming skinning with a spatula and shown. The adhesive strength under shear was measured by preparing a test sample using a polycarbonate resin as an adherend, allowing the sample to cure at 23° C. for 3 days and at 50° C. for 4 days, and subjecting it to tensile testing at 50 mm/min. The results of evaluations were as follows.

Whereas the composition according to Example 1 which contained dimethoxysilyl and trimethoxysilyl functional group as the reactive silyl group of the (B) component acrylic copolymer was satisfactory in both storage stability and cure rate, the composition according to Comparative Example 1 which contained dimethoxysilyl groups only was slow in cure rate and the composition of Comparative Example 2 containing trimethoxysilyl groups only was inferior in storage stability. Furthermore, the compositions according to Examples 2 to 5 were not only fast-curing as compared with the composition of Comparative Example 3 containing dimethoxysilyl groups only but also highly adhesive as compared with the compositions of Comparative Examples 4 and 5 which contained trimethoxysilyl groups only. The composition of Comparative Example 6, the silyl content of which was low, was satisfactory in curability but inadequate in adhesiveness.

What is claimed is :

1. A curable composition comprising an oxyalkylene polymer (A) containing silyl functional group capable of crosslinking by forming a siloxane bond and a copolymer (B) having a molecular chain comprising alkyl acrylate and/or alkyl methacrylate monomer units and containing silyl functional group capable of crosslinking by forming a siloxane bond,
   said copolymer (B) having both dialkoxysilyl and trialkoxysilyl groups as said silyl functional group.
2. The curable composition according to claim 1,
   wherein said copolymer (B) has both dialkoxysilyl and trialkoxysilyl groups within the molecule.
3. The curable composition according to claim 1,
   wherein said copolymer (B) is a mixture of a copolymer having dialkoxysilyl functional group and a copolymer having trialkoxysilyl functional group.
4. The curable composition according to claim 1,
   which comprises said polymer (A) contains at least one dimethoxysilyl group per molecule and has a number average molecular weight of not less than 6,000,
   while said copolymer (B) contains at least an average of 0.2 trimethoxysilyl groups and at least an average of 0.2 dimethoxysilyl groups per molecule, and
   which comprises further contains a cure accelerating catalyst (C).
5. The curable composition according to claim 4,
   wherein the cure accelerating catalyst (C) is a non-organotin catalyst.
6. The curable composition according to claim 4,
   wherein the cure accelerating catalyst (C) is a non-tin catalyst.
7. The curable composition according to claim 4,
   wherein the cure accelerating catalyst (C) comprises at least one compound selected from the group consisting of an organic carboxylic acid, an organic carboxylic acid metal salt, and an amine compound.
8. The curable composition according to claim 4,
   wherein the cure accelerating catalyst (C) comprises an acidic phosphate ester.
9. The curable composition according to claim 4,
   wherein the cure accelerating catalyst (C) comprises a Group 3B or 4A metal.
10. The curable composition according to claim 1,
    wherein at least one kind of silyl functional group in the copolymer (B) is a functional group selected from the group consisting of methyldimethoxysilyl, trimethoxysilyl, methyldiethoxysilyl, triethoxysilyl, methyldiisopropenyloxysilyl, and triisopropenyloxysilyl group.
11. The curable composition according to claim 2,
    which comprises said polymer (A) contains at least one dimethoxysilyl group per molecule and has a number average molecular weight of not less than 6,000,
    while said copolymer (B) contains at least an average of 0.2 trimethoxysilyl groups and at least an average of 0.2 dimethoxysilyl groups per molecule, and
    which comprises further contains a cure accelerating catalyst (C).
12. The curable composition according to claim 3,
    which comprises said polymer (A) contains at least one dimethoxysilyl group per molecule and has a number average molecular weight of not less than 6,000,
    while said copolymer (B) contains at least an average of 0.2 trimethoxysilyl groups and at least an average of 0.2 dimethoxysilyl groups per molecule, and
    which comprises further contains a cure accelerating catalyst (C).
13. The curable composition according to claim 5,
    wherein the cure accelerating catalyst (C) is a non-tin catalyst.

14. The curable composition according to claim 5, wherein the cure accelerating catalyst (C) comprises at least one compound selected from the group consisting of an organic carboxylic acid, an organic carboxylic acid metal salt, and an amine compound.

15. The curable composition according to claim 6, wherein the cure accelerating catalyst (C) comprises at least one compound selected from the group consisting of an organic carboxylic acid, an organic carboxylic acid metal salt, and an amine compound.

16. The curable composition according to claim 5, wherein the cure accelerating catalyst (C) comprises an acidic phosphate ester.

17. The curable composition according to claim 6, wherein the cure accelerating catalyst (C) comprises an acidic phosphate ester.

18. The curable composition according to claim 7, wherein the cure accelerating catalyst (C) comprises an acidic phosphate ester.

19. The curable composition according to claim 5, wherein the cure accelerating catalyst (C) comprises a Group 3B or 4A metal.

20. The curable composition according to claim 6, wherein the cure accelerating catalyst (C) comprises a Group 3B or 4A metal.

21. The curable composition according to claim 10, wherein a mole percentage of trimethoxysilyl groups based on all reactive silyl groups is not less than 5% but less than 50%.

* * * * *